(12) United States Patent
Kudelski et al.

(10) Patent No.: US 7,668,311 B2
(45) Date of Patent: Feb. 23, 2010

(54) METHOD AND SYSTEM FOR TRANSMISSION OF DECRYPTING INFORMATION

(75) Inventors: André Kudelski, Lutry (CH); Marco Sasselli, Chardonne (CH)

(73) Assignee: NagraCard S.A., Cheseaux-sur-Lausanne (CH)

( * ) Notice: Subject to any disclaimer, the term of this patent is extended or adjusted under 35 U.S.C. 154(b) by 570 days.

(21) Appl. No.: 10/168,608

(22) PCT Filed: Jan. 24, 2001

(86) PCT No.: PCT/IB01/00094

§ 371 (c)(1),
(2), (4) Date: Jun. 24, 2002

(87) PCT Pub. No.: WO01/56287

PCT Pub. Date: Aug. 2, 2001

(65) Prior Publication Data

US 2002/0191789 A1    Dec. 19, 2002

Related U.S. Application Data

(60) Provisional application No. 60/226,769, filed on Aug. 21, 2000.

(30) Foreign Application Priority Data

Jan. 28, 2000    (CH)    ..................................... 0166/00

(51) Int. Cl.
*H04N 7/167*    (2006.01)

(52) U.S. Cl. ...................................... 380/200; 380/241
(58) Field of Classification Search ................. 380/200, 380/210, 239, 241; 713/150
See application file for complete search history.

(56) References Cited

U.S. PATENT DOCUMENTS

| | | | | |
|---|---|---|---|---|
| 5,349,641 | A * | 9/1994 | Coutrot et al. | 380/241 |
| 6,052,390 | A * | 4/2000 | Deliot et al. | 370/528 |
| 6,105,134 | A * | 8/2000 | Pinder et al. | 713/170 |
| 6,219,422 | B1 * | 4/2001 | Sato | 380/240 |
| 6,243,469 | B1 * | 6/2001 | Kataoka et al. | 380/255 |
| 6,690,795 | B1 * | 2/2004 | Richards | 380/203 |
| 6,898,285 | B1 * | 5/2005 | Hutchings et al. | 380/200 |

FOREIGN PATENT DOCUMENTS

EP    0583202 A    2/1994

* cited by examiner

*Primary Examiner*—Matthew B Smithers
*Assistant Examiner*—Ali S Abyaneh
(74) *Attorney, Agent, or Firm*—Stuart J. Friedman

(57) ABSTRACT

At the moment of the diffusion of Pay-TV with multi-channel signals, each channel is associated to authorization messages (ECM) which allow to decrypt this channel according to the rights of the subscriber. When changing channel, a very short time is accepted before one has determined these new rights in relation with the new channel. The heavy encrypting algorithms are thus excluded. To avoid this drawback, to decrypt a channel, a system is proposed using the combination of the authorization information for a channel (ECM), and thus encrypted by a fast algorithm, with authorization information (MECM) for a group of channels. These latter are encrypted by a high security algorithm and are thus slower to decrypt.

8 Claims, 1 Drawing Sheet

METHOD AND SYSTEM FOR TRANSMISSION OF DECRYPTING INFORMATION

CROSS REFERENCE TO RELATED APPLICATIONS

The present application is a Chapter II National Stage filing from PCT/IB01/00094, International filing date of 24 Jan. 2001, which claims priority to CH 0166/00 filed 28 Jan. 2000, and U.S. 60/226,769 filed 21 Aug. 2000. Each of the above applications is incorporated herein by reference.

FIELD OF THE INVENTION

This invention concerns a process and system of decrypting information (data) transmission between a management system and a subscriber's decoder.

BACKGROUND OF THE INVENTION

The decoders of subscribers of Pay-TV contain a decrypting unit able to treat the arriving signals by cable or by hertz. These signals can be analog or digital.

These signals are of different types, according to whether they contain audio type information, video or of control.

The latter category includes management messages (called EMM messages) that is to say messages containing controls directed to a decoder or to a group of decoders, and control messages (called ECM messages), that is to say containing authorization messages among others, information allowing to decrypt the signals in transmission.

BRIEF DESCRIPTION OF THE DRAWINGS

The invention will be better understood thanks to the following detailed description which refers to the annexed drawings which are given as an example not limitative, in which.

DESCRIPTION OF THE PREFERRED EMBODIMENTS

Figure 1:
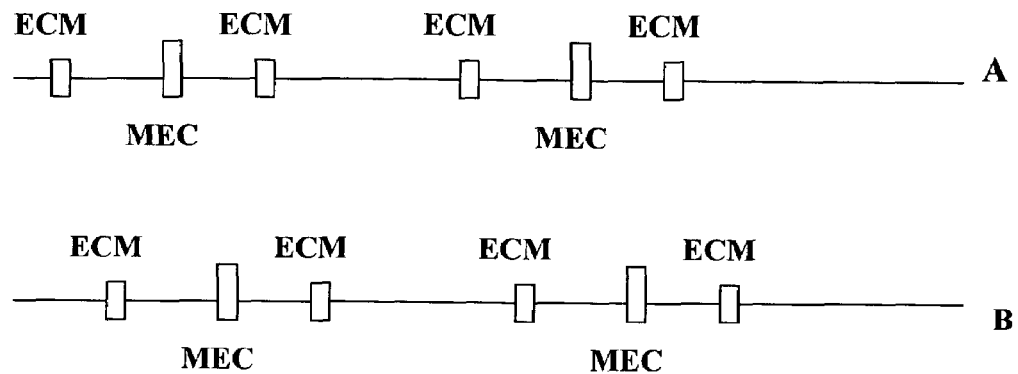
FIG. 1 represents the transmission of the (ECM) and (MECM) messages on two channels A and B.

In the present application, we refer to authorization messages (ECM) destined to the decrypting of the audio and video signals.

The offer proposed to subscribers of Pay-TV includes many channels each of which encrypted according to one or more particular keys. This is necessary because of the fact that a subscriber can undertake a subscription for a channel without having the right to take advantage of others channels.

The authorization messages (ECM) are encrypted with a key suitable for the management system. The subscriber's decoder includes a security cryptographic unit able to decrypt these messages. For security reasons, the authorization information allowing the decrypting of the useful signals (video and audio) are changed periodically. The management system transmits these messages (ECM) under encrypted form to the cryptographic unit able to decrypt these messages, manages the authorizations and according to the rights of the subscriber, transmits to the decoder the information necessary for the decrypting of video and audio signals.

The result of the decrypting by the cryptographic unit is called "control word" abbreviated with "CW". The control-words pilot the decoder and the subscriber can thus have the full advantage of the transmitted information.

As indicated above, these control-words are changed regularly in order to prevent a pirate to calculate this information of control by means of a powerful computer, and benefit free of charge from a paying service. This is why these control-words are changed regularly, the period being typically from 1 to 20 seconds. This period is called crypto-period.

The authorization messages (ECM) are sent with a higher frequency than the crypto-period, for example every 100 milliseconds. This is indispensable on the one hand when starting the decoder service and, on the other hand when changing channels.

In fact, to be able to visualize the desired transmission, the control-words are necessary for the decrypting of the signals. It is not good to wait 5 seconds in front of the screen in order that the image clearly appears.

In the second case, the control-words being for each channel, one should await the end of the crypto-period to receive the authorization message allowing the decrypting of the signals of the new channel. In the same way as previously stated, one cannot accept a delay of several seconds when changing channel.

This is why, in practice, the authorization messages (ECM) are sent to a frequency comprised between 5 and 20 per second.

When changing channel, the time separating the order of the subscriber and the visualization of the desired channel must be the shorter one. According to the usual standards, a duration of about 500 milliseconds is considered as being acceptable.

During this lapse of time, the following operations are carried out:

placement of the audio, video and control filters on the new channel;

waiting of the next message (ECM) containing the encrypted control-word for said channel;

reception of this message (ECM) and transmission to the cryptographic unit for decrypting; and execution of the decrypting algorithm by the cryptographic unit and return of the decrypted control-word, transmission of this word to the decoder;

start of the MPEG decompression and waiting of an image complete of synchronization.

One sees, by the chaining of these operations, that it cannot be carried out in parallel, and thus each of them goes into the determination of the maximum duration in the case of change of channel.

It is known that the more the encrypting algorithm is of high security, the more the operations necessary for the decrypting are long. On the other hand, the decrypting time taking part directly in the calculation of the commutation duration between channels, cannot be lengthened to improve the quality of the encryption. This is why the security of the used algorithms to obtain the control-words is obligingly limited by these constraints of time.

A known method is described in the document EP 0 583 202 and consists in sending, on the active channel, not only the authorization messages (ECM) of the channel concerned, but also the authorization messages of the other channels. These latter are transmitted to a lower frequency so as not to congest the transmission.

This method presents the drawbacks to congest the channel with unnecessary messages and needs the memorization of all authorization messages for a use when changing channel. Another unsolved aspect by this document is the increase of the quality (and thus of the duration) of the decrypting operation which should not increase the commutation time between channels.

The aim of this invention is to propose a method and a transmission system of encrypted information which assures a high security to the destination control-words of the decoder, without lengthening the duration of treatment of the control-word specific to a channel.

This aim is fully reached by the utilization of a control-word obtained by combination of the decrypting of an authorization message (ECM) for each channel and of the decrypting of an authorization message common to a group of channels.

In the following description, the messages for each channel are called "mono-channel authorization messages (ECM)" and the messages common to a group of channels are called "multi-channel authorization messages (MECM)" (Master ECM).

The algorithm of treating the messages (ECM) is of the fast type and offers thus a limited security. This is imposed by the little time required at the time of the passage from one channel to another.

On the other hand, according to the invention, it is not possible to obtain the control-words (CW) only by the treatment of the mono-channel messages (ECM). The cryptographic unit, to be able to decrypt the encrypted information, must contain the received information in a mono-channel message (ECM) and in a multi-channel message (MECM). The latter is decrypted by a key called system because it is independent form the different channels.

At the moment of the change or commutation from one channel to another, the information contained in the mono-channel authorization message (ECM) suitable for the new channel is combined with the information contained in the multi-channel authorization message (MECM) already in the cryptographic unit, these latter being common to the two channels. In this way, the decrypting duration of the message (MECM) does not intervene in the calculation of the commutation duration as described above. Therefore, the algorithm to decrypt the messages (MECM) can be stronger and thus need a longer time without therefore penalizing the commutation time. Furthermore, the simple use of a different algorithm increases the security of the system.

The content of the multi-channel messages (MECM) can vary according to a period identical to the message (ECM) (crypto-period), or according to a multiple of this period.

If the time between two mono-channel messages (ECM) is important, since it intervenes directly in the calculation of the maximum time of commutation between two channels, it is not the same for the time between two multi-channel messages (MECM). Since this message is common to a group of channels, it can have a greater time. In fact, its repetition interval intervenes only at the moment of the placing under tension of the decoder. In the case of the figure, one sees that a repetition of 1 to 2 messages per second is sufficient.

In FIG. 1 the messages allowing to decrypt the video and audio signals are represented schematically, on two lines. One can observe at regular intervals, the transmission of the mono-channel messages (ECM) for each channel. On the "A" channel, the "A" mono-channel authorization messages (ECM) are transmitted. On the "B" channel, the "B" mono-channel authorization messages (ECM) are transmitted. The multi-channel messages (MECM) common to channels A and B, are transmitted on the two channels.

In a mode of realization using the analog diffusion, the mono-channel and multi-channel authorization messages are effectively transmitted on each channel, one channel being associated to one frequency. On the other hand, on the numerical diffusion systems, the notion of a channel associated to a frequency does not exist. The multi-channel messages (MECM) can be added in the messages for this channel or transmitted in a global way to the information flux without it being necessary to repeat it on each channel.

According to this example, the periodicity of the multi-channel messages (MECM) is lower by half to the periodicity of the mono-channel messages (ECM). The periodicity of the messages (MECM) is determined by the acceptable decrypting time at the moment of the first use. In this case, it will be possible to decrypt the signals after having received at least one message (ECM) and one message (MECM). This is why a repetition of approximately one second for the message (MECM) is acceptable and does not encumber the pass-band of the system. Once the message (MECM) is received and treated, it is immediately available when changing channel with the new message (ECM).

Another aspect of the invention is the taking into account of the reductions from the start of the crypto-period according to the channels. In fact, the change of the control-word can be made at different moments according to the channels. Therefore, for example, on the "A" channel, the control-word (CW) changes, from CW-A1 to CW-A2. According to the invention, the control-word is from then obtained due to the multi-channel message (MECM-2). On the other hand, in the hypothesis where the new channel B operates always with the control-word (CW-B1), it will be necessary to use the multi-channel message (MECM-1). This is why each message (MECM) contains the information of several crypto-periods, so allowing to be free of differences of synchronization of the channels.

Figure 2:
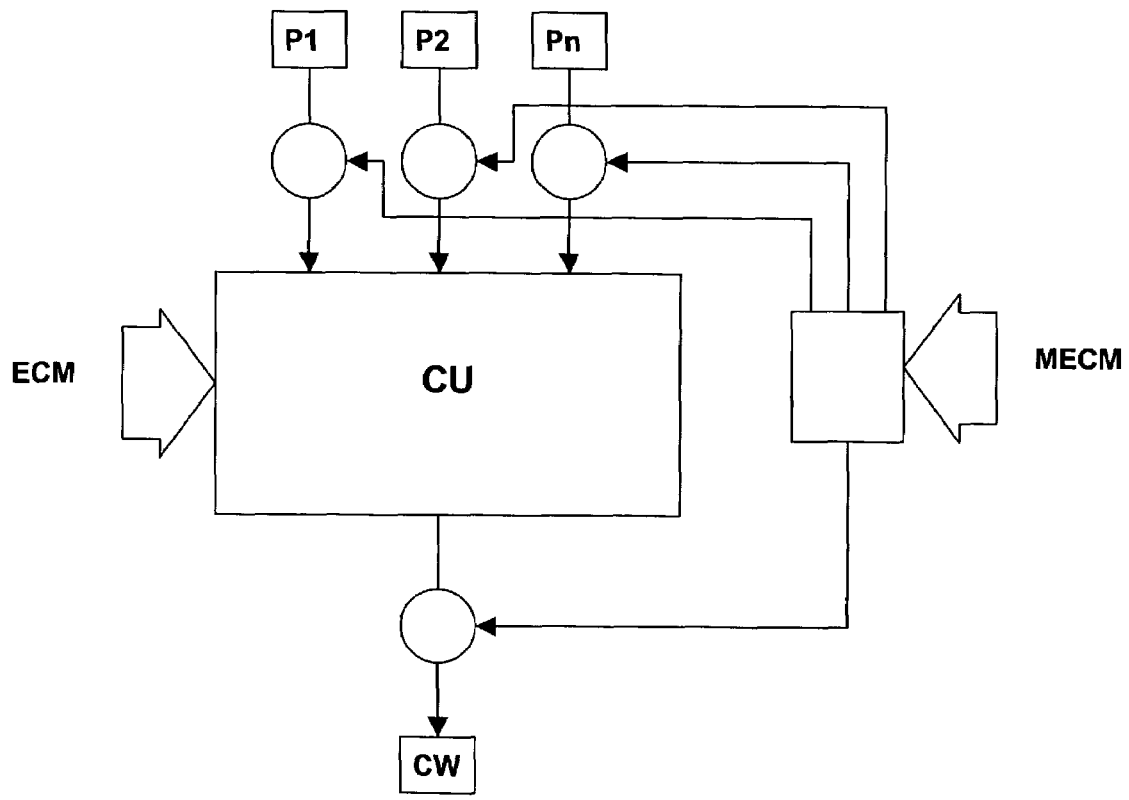
FIG. 2 represents the security cryptographic unit.

FIG. 2 illustrates the functionality of these data transmitted in the multi-channel message (MECM). The mono-channel message (ECM) contains the control-word (CW) under encrypted form and is transmitted to the cryptographic unit (CU) able to decrypt this information. For this, it disposes of parameters P1, P2 to Pn which define the rights associated to the system in general, and to this channel in particular. This unit calculates, thanks to these parameters, the control-word (CW). According to the invention, the data transmitted by the message (MECM), once decrypted, can modify the parameters upstream of the cryptographic unit (CU), or downstream of this unit.

According to a particular form of the invention, the final control-word (CW) is obtained by a logic operation between the information contained in the message (MECM) and the message (ECM), such that addition, subtraction, or exclusive or multiplication.

The invention claimed is:

1. A multi-channel transmission system of encrypted information for Pay-TV, comprising a management centre and at least one subscriber unit, the management centre transmitting mono-channel authorization messages encrypted for each channel, said management center also transmitting encrypted multi-channel authorization messages common to a group of channels, said multi-channel authorization messages being transmitted to a subscriber unit at a lower frequency of transmission than that of said mono-channel authorization messages, said subscriber unit including a security cryptographic unit for decrypting said mono-channel authorization messages and said multi-channel authorization messages, said cryptographic unit using a first encryption algorithm for decrypting said mono channel authorization messages to obtain a first information and using a second encryption algorithm for decrypting the multi-channel authorization messages received after switching on of the subscriber unit to obtain a second information, said first and second algorithms being different, said cryptographic unit combining the decrypted multi-channel authorization messages with the decrypted mono-channel authorization messages for the retrieval of at least one control word, said at least one control word being formed by a combination of first information contained in at least one of said mono-channel authorization messages and second information contained in at least one of said multi-channel authorization messages received after the switching on of said subscriber unit.

2. A multi-channel transmission system according to claim 1, wherein the multi-channel authorization messages are modified according to a first period different to a second period of the mono-channel authorization messages.

3. A multi-channel transmission system according to claim 1, wherein the second information contained in the multi-channel authorization messages is combined with the first information contained in the mono-channel authorization messages by an operation including at least one of addition, subtraction, exclusive, multiplication and coding.

4. A multi-channel transmission system according to claim 1, wherein the multi-channel authorization messages comprise a cryptographic parameter for decrypting the mono-channel authorization messages in said security cryptographic unit.

5. A transmission method of multi-channel encrypted signals for Pay-TV, the transmission method comprising:
switching on a subscriber unit,
transmitting multi-channel encrypted signals to the subscriber unit,
transmitting mono-channel authorization messages encrypted for each channel,
decrypting the mono-channel authorization messages for one of the channels currently received by a cryptographic unit to obtain a first information,
transmitting multi-channel authorization messages common to a group of channels to said subscriber unit at a lower frequency of transmission than that of said mono-channel authorization messages,
decrypting the multi-channel authorization messages received after the switching on of said subscriber unit with a different algorithm than used to decrypt the mono-channel authorization messages to obtain a second information, and
combining the decrypted second information of the multi-channel authorization messages with the decrypted first information of the mono-channel authorization messages for the retrieval of at least one control word, said at least one control word being formed by a combination of first information contained in at least one of said mono-channel authorization messages and second information contained in at least one of said multi-channel authorization messages.

6. A transmission method of multi-channel encrypted signals according to claim 5, wherein the combination is done on at least one entry parameter of the cryptographic unit.

7. A transmission method of multi-channel encrypted signals according to claim 5, wherein the combination is done on the results obtained by the cryptographic unit.

8. A transmission method of multi-channel encrypted signals according to claim 5, further comprising:
modifying the multi-channel authorization messages according to a period different to a modification period of the mono-channel authorization messages.

* * * * *

UNITED STATES PATENT AND TRADEMARK OFFICE
CERTIFICATE OF CORRECTION

| | | |
|---|---|---|
| PATENT NO. | : 7,668,311 B2 | Page 1 of 1 |
| APPLICATION NO. | : 10/168608 | |
| DATED | : February 23, 2010 | |
| INVENTOR(S) | : Kudelski et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 967 days.

Signed and Sealed this

Seventh Day of December, 2010

David J. Kappos
*Director of the United States Patent and Trademark Office*